US008117100B1

(12) United States Patent
Hopkins

(10) Patent No.: US 8,117,100 B1
(45) Date of Patent: Feb. 14, 2012

(54) SYSTEMS AND METHODS FOR MANAGING CONSOLIDATED PURCHASING, BILLING AND PAYMENT INFORMATION

(75) Inventor: John C. Hopkins, San Antonio, TX (US)

(73) Assignee: Unites Services Automobile Association (USAA), San Antonio, TX (US)

( * ) Notice: Subject to any disclaimer, the term of this patent is extended or adjusted under 35 U.S.C. 154(b) by 23 days.

(21) Appl. No.: 12/051,149

(22) Filed: Mar. 19, 2008

(51) Int. Cl.
*G07F 19/00* (2006.01)
*H04M 15/00* (2006.01)

(52) U.S. Cl. ......................................... 705/34; 235/380
(58) Field of Classification Search .................. 235/379, 235/380, 375, 330; 705/1, 5, 13, 35, 38, 705/40, 39; 364/406, 408
See application file for complete search history.

(56) References Cited

U.S. PATENT DOCUMENTS

| | | | | |
|---|---|---|---|---|
| 5,684,965 | A * | 11/1997 | Pickering | 705/34 |
| 5,978,780 | A | 11/1999 | Watson | |
| 6,732,919 | B2 * | 5/2004 | Macklin et al. | 235/380 |
| 2004/0215559 | A1 | 10/2004 | Rebenack et al. | |
| 2006/0212393 | A1 * | 9/2006 | Lindsay Brown | 705/40 |
| 2007/0233615 | A1 | 10/2007 | Tumminaro | |
| 2007/0244811 | A1 | 10/2007 | Tumminaro | |
| 2007/0255620 | A1 | 11/2007 | Tumminaro et al. | |
| 2007/0255652 | A1 | 11/2007 | Tumminaro et al. | |
| 2007/0255653 | A1 | 11/2007 | Tumminaro et al. | |
| 2007/0255662 | A1 | 11/2007 | Tumminaro | |

OTHER PUBLICATIONS

"DST Output Provides Consolidated Billing Statement for RCN Corporation's Bundled Offering of Phone, Cable, and High-Speed Internet Services." PR Newswire Mar. 25, 2004 Business Dateline, ProQuest. Web. Nov. 2, 2011.*

* cited by examiner

*Primary Examiner* — Matthew Gart
*Assistant Examiner* — Rokib Masud
(74) *Attorney, Agent, or Firm* — Perkins Coie LLP

(57) ABSTRACT

A method, system and computer-usable medium are disclosed for managing purchase, billing, and payment transactions. A unique identifier of a consolidated purchase card account, issued by a service provider to a user, is accepted by a plurality of vendors as a proxy of the unique identifier of their own vendor-issued purchase card account. Purchase transactions resulting from acceptance of the consolidated purchase card account are processed to produce an individual billing statement for each vendor. The individual billing statements are aggregated into a consolidated billing statement by the service provider, which is then presented to the user on behalf of each vendor. The user reviews the consolidated billing statement and provides payment instructions to the service provider. The payment instructions are processed to pay funds from a funding account of the user to each respective vendor.

21 Claims, 14 Drawing Sheets

| Consolidated Billing Statement 704 | | | |
|---|---|---|---|
| Vendor | Balance | Minimum Payment | Due Date |
| Barney's New York 720 | $1,765.48 | $350.00 | 09/12/08 |
| Bloomingdales 722 | $564.34 | $100.00 | 09/17/08 |
| Dillards 724 | $211.67 | $50.00 | 09/22/08 |
| Generica 726 | $544.38 | $75.00 | 09/11/08 |
| Macy's 728 | $366.85 | $50.00 | 09/20/08 |
| Neiman Marcus 730 | $897.23 | $125.00 | 09/10/08 |
| Nordstrom 732 | $899.45 | $125.00 | 09/24/08 |
| Sears 734 | $226.88 | $45.00 | 09/12/08 |

FIGURE 7a

| Consolidated Billing Statement 704 | | | | |
|---|---|---|---|---|
| 716 | Vendor | Balance | Minimum Payment | Due Date |
| BARNEY'S NEWYORK | Barney's New York 720 | $1,765.48 | $350.00 | 09/12/08 |
| bloomingdales | Bloomingdales 722 | $564.34 | $100.00 | 09/17/08 |
| Dillard's | Dillards 724 | $211.67 | $50.00 | 09/22/08 |
| Generica | Generica 726 | $544.38 | $75.00 | 09/11/08 |
| macy's | Macy's 728 | $366.85 | $50.00 | 09/20/08 |
| Neiman Marcus | Neiman Marcus 730 | $897.23 | $125.00 | 09/10/08 |
| NORDSTROM | Nordstrom 732 | $899.45 | $125.00 | 09/24/08 |
| SEARS | Sears 734 | $226.88 | $45.00 | 09/12/08 |

FIGURE 7b

SYSTEMS AND METHODS FOR MANAGING CONSOLIDATED PURCHASING, BILLING AND PAYMENT INFORMATION

CROSS REFERENCE TO RELATED APPLICATIONS

U.S. patent application Ser. No. 12/051,106, entitled "Systems and Methods for Managing Consolidated Purchasing and Billing Information," inventor John C. Hopkins, filed on Mar. 19, 2008, describes exemplary methods and systems and is incorporated by reference in its entirety.

U.S. patent application Ser. No. 12/051,113, entitled "Systems and Methods for Managing Consolidated Purchasing and Billing Information," inventor John C. Hopkins, filed on Mar. 19, 2008, describes exemplary methods and systems and is incorporated by reference in its entirety.

U.S. patent application Ser. No. 12/051,122, entitled "Systems and Methods for Managing Consolidated Purchasing and Billing Information," inventor John C. Hopkins, filed on Mar. 19, 2008, describes exemplary methods and systems and is incorporated by reference in its entirety.

U.S. patent application Ser. No. 12/051,165, entitled "Systems and Methods for Managing Consolidated Purchasing, Billing and Payment Information," inventor John C. Hopkins, filed on Mar. 19, 2008, describes exemplary methods and systems and is incorporated by reference in its entirety U.S. patent application Ser. No. 12/051,172, entitled "Systems and Methods for Managing Consolidated Purchasing, Billing and Payment Information," inventor John C. Hopkins, filed on Mar. 19, 2008, describes exemplary methods and systems and is incorporated by reference in its entirety.

BACKGROUND

1. Field of the Disclosure

Embodiments of the disclosure relate in general to the field of computers and similar technologies, and in particular to software utilized in this field. Still more particularly, it provides a system, method, and computer-usable medium for purchase, billing, and payment transactions.

2. Description of the Related Art

Today's consumers have become accustomed to using a wide variety of cards in their daily activities. In addition to identification cards, consumers also conduct financial and purchase transactions with credit cards, debit cards, stored value cards, and cards issued by individual vendors. While many of these vendors will accept other financial cards for payment, they often prefer to issue their own card in an attempt to reinforce their brand identity and to establish closer relationships with their customers. However, such vendor-issued cards are typically not accepted by other vendors. The growing volume of financial and purchase cards available to consumers often results in having to decide how many, and which, cards will be carried. As a result, the choice is often to pick a small number of cards that are most widely accepted by the largest number of vendors. By definition, such cards are generally not vendor-issued. However, different cards may be carried at different times for different purposes.

As a result, it is not unusual for individuals to still receive a large number of bills, each of which need to be paid on a periodic basis. Traditional methods of paying bills, which include receiving billing statements interleaved with promotions, writing paper checks, recording payments, and mailing envelopes have become cumbersome for many. In response to this issue, financial institutions, service providers, and individual vendors have begun to offer on-line bill presentment services, which have become increasingly popular. However, each of these implementations has its own advantages and limitations. Financial institutions provide simplified access to funding accounts for payment of individual vendors, but detailed purchase transaction information for individual vendors is usually not available. Service providers may be able to provide transaction level billing detail, but not be able to preserve a vendor's brand identity or convey their promotional offers. Vendors are able to not only maintain their brand identity and offer promotions with their own service, but they can often offer details about each purchase transaction on a billing statement. However, most consumers are reluctant to go to multiple vendor sites simply to review and pay their bills.

In view of the foregoing, there is a need for consumers to have a single purchase card that would be accepted by multiple vendors in place of their own vendor-issued cards, yet still receive individual billing statements from each vendor. Likewise, there is a need to have such billing statements aggregated for on-line presentment to consumers, who would then be able to review and examine the details of individual transactions within each billing statement while online. There is a corresponding need for vendors to preserve their respective brand identities and have access to an additional channel for their promotions. Additionally, there is a need for the ability to make payments on-line and for vendors to receive them electronically.

BRIEF SUMMARY

A method, system and computer-usable medium are disclosed for managing purchase, billing, and payment transactions. In various embodiments, a consolidated purchase, payment, and billing system is implemented to provide a consolidated purchase card, issued by a service provider, that is accepted by a plurality of vendors as a proxy of a purchase card issued by the vendor themselves. In various embodiments, purchase transactions resulting from acceptance of the consolidated purchase card are processed to produce an individual billing statement for each vendor who accepted the consolidated purchase card. The resulting individual billing statements are then aggregated by the service provider into a consolidated billing statement, which is presented by the service provider on behalf of each vendor to the account holder of the consolidated purchase card that made the purchases.

Upon review of the consolidated billing statement, the account holder provides payment instructions to the service provider to pay each vendor. In one embodiment, the account holder selectively chooses which vendors to pay, and an amount to pay each vendor. In another embodiment, the account holder elects to pay the minimum payment amount due to each vendor. In yet another embodiment, the account holder elects to pay the outstanding balance due to each vendor. In still another embodiment, the account holder elects to pay a fixed amount to each vendor. In one embodiment, the account holder elects to pay a percentage of the outstanding balance due to each vendor. In various other embodiments, payment allocation rules are implemented to allocate percentage amounts of a single payment to the outstanding balances due to different vendors.

In one embodiment, the payment instructions comprise a payment initiation date. In various embodiments, the account holder can elect to have all vendors be paid on the same date, or select a payment initiation date for each vendor. Once received, the payment instructions are processed by the service provider to withdraw payment funds from a first funding account of the account holder. In one embodiment a second funding account is accessed if there are insufficient payment funds available in the first funding account. In another embodiment the account holder designates which funding account is used to pay each vendor. The withdrawn payment funds are then transferred to each vendor's respective financial institution.

BRIEF DESCRIPTION OF THE DRAWINGS

Selected embodiments of the disclosure may be understood, and its numerous objects and features obtained, when the following detailed description is considered in conjunction with the following drawings, in which:

FIGS. 7a-d are a simplified illustration of a consolidated purchase, payment, and billing system as implemented to display vendor trade dress and transaction detail within a user interface (UI);

DETAILED DESCRIPTION

Figure 1:
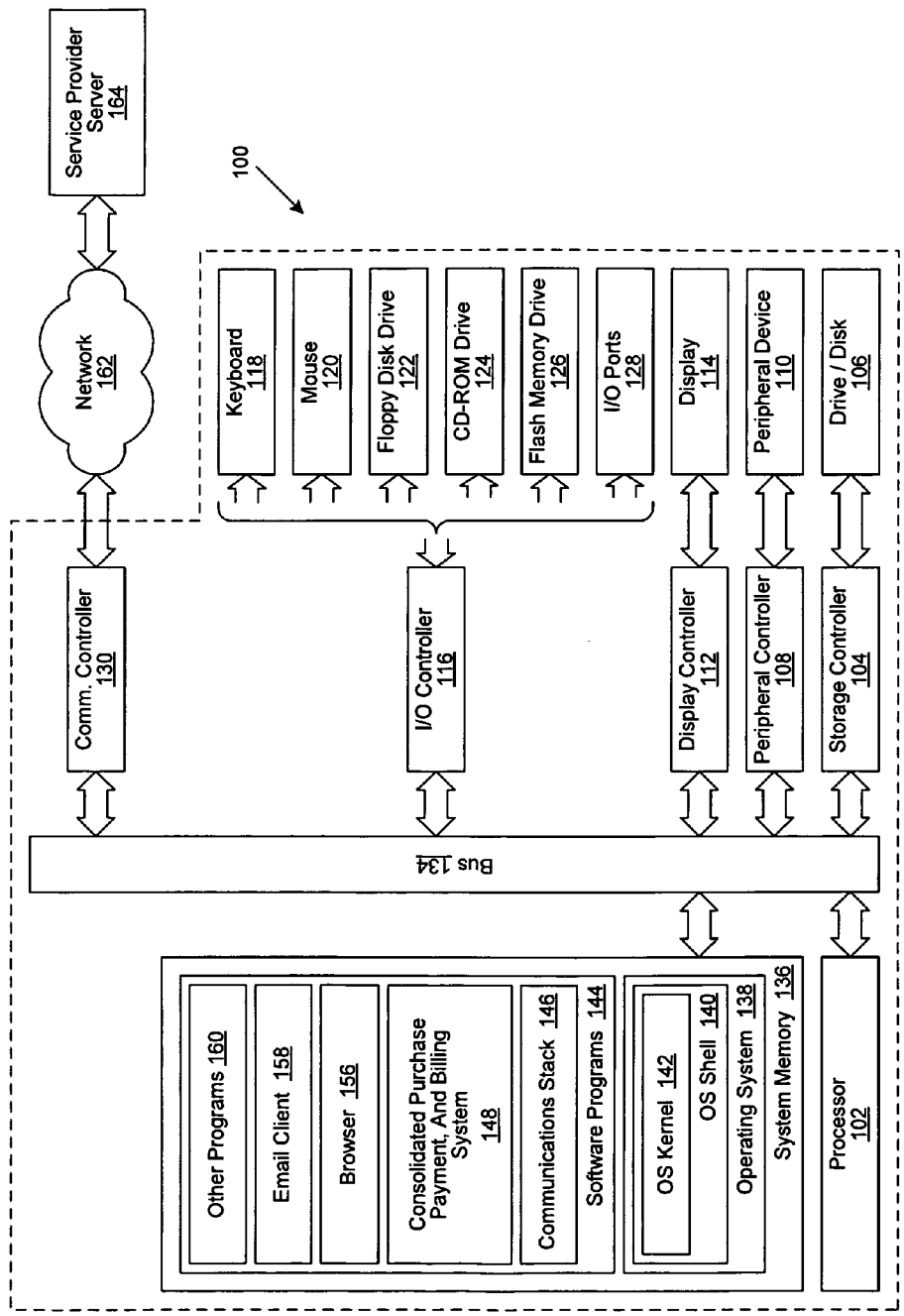
FIG. 1 depicts an exemplary client information processing system (IPS) in which embodiments of the disclosure may be implemented.

A method, system and computer-usable medium are disclosed for managing purchase, billing, and payment transactions. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a consolidated purchase, payment, and billing system 148. The consolidated purchase, payment, and billing system 148 includes code for implementing the processes described in FIGS. 2-10 described hereinbelow. In one embodiment, client IPS 100 is able to download consolidated purchase, payment, and billing system 148 from a service provider server 164.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
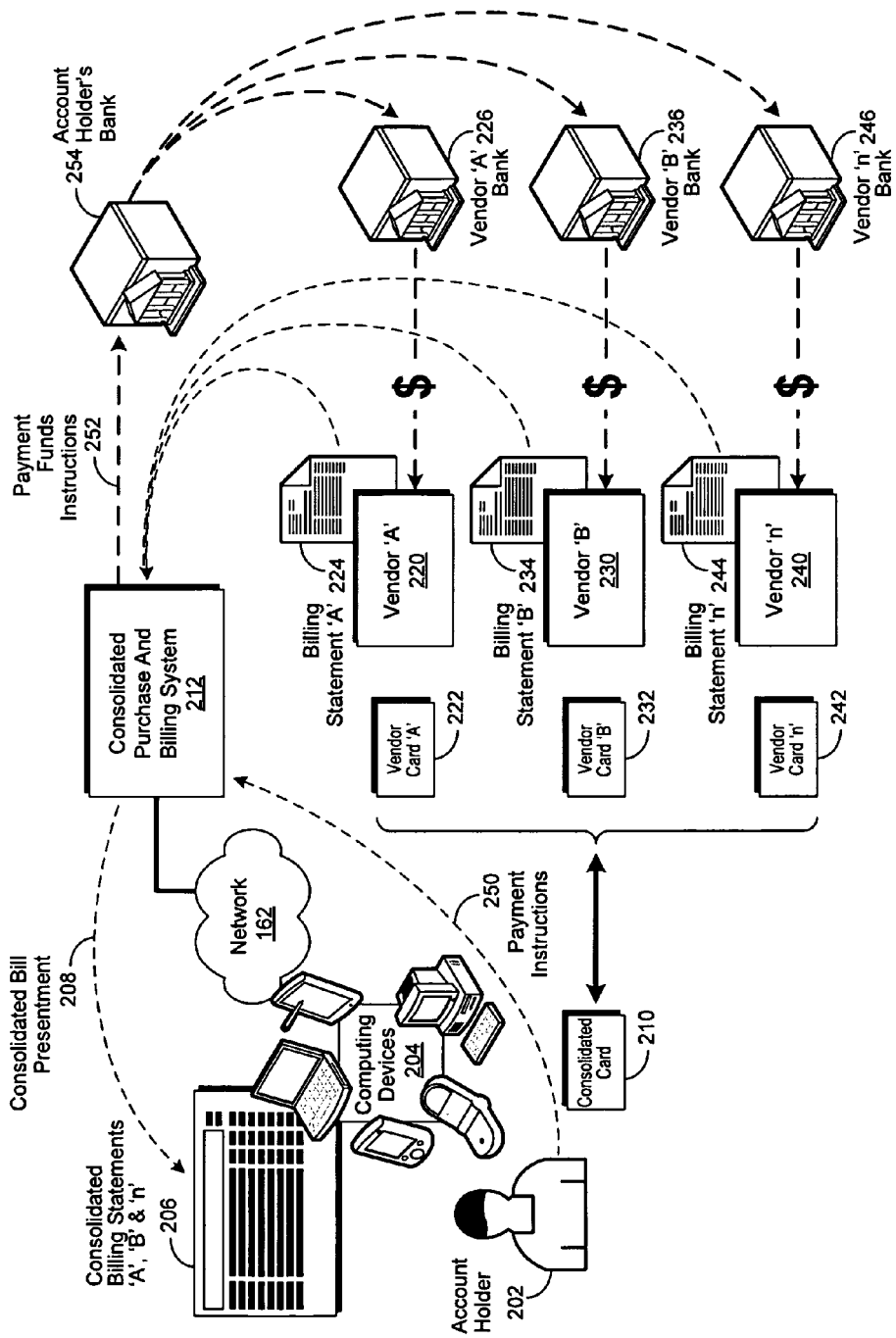
FIG. 2 is a simplified block diagram of a consolidated purchase, payment, and billing system as implemented for multiple vendors.

FIG. 2 is a simplified block diagram of a consolidated purchase, payment, and billing system as implemented for multiple vendors. As used herein, a consolidated purchase, payment, and billing system is defined as providing a consolidated purchase card, issued by a service provider, that is accepted by a plurality of vendors as a proxy of a purchase card issued by the vendor themselves. Purchase transactions resulting from acceptance of the consolidated purchase card are processed to produce an individual billing statement for each vendor who accepted the consolidated purchase card. The resulting individual billing statements are then aggregated by the service provider into a consolidated billing statement and presented on behalf of each vendor to the account holder of the consolidated purchase card that made the purchases.

The account holder then provides payment instructions to the service provider to pay each vendor. Payment funds are withdrawn from a funding account of the consolidated purchase card account holder and transferred to each vendor's respective financial institution.

Referring now to FIG. 2, in various embodiments account holder 202 is issued a consolidated purchase card 210 that is an equivalent of a plurality of cards 'A' 222, 'B' 232, and 'n' 242 issued respectively by vendors 'A' 220, 'B' 230, and 'n' 240. In these and other embodiments, vendors 'A' 220, 'B' 230, and 'n' 240 accept the consolidated purchase card 210 as a proxy of their respectively-issued vendor cards 'A' 222, 'B' 232, and 'n' 242 to initiate a purchase transaction. Such purchase transactions are processed similarly to purchase transactions initiated with a purchase card 'A' 222, 'B' 232, and 'n' 242 respectively issued by vendor A' 220, 'B' 230, and 'n' 240. The purchase transactions resulting from the acceptance of accepting account holder's 202 consolidated purchase card 210 by vendors 'A' 220, 'B' 230, and 'n' 240 are then respectively appended to vendor billing statements 'A' 224, 'B' 234, and 'n' 244.

The respective billing statements 'A' 224, 'B' 234, and 'n' 244 are then aggregated for presentment 208 as a consolidated billing statement 206 to account holder 202. In various embodiments, account holder 202 uses computing devices 204 to access the consolidated purchase, payment, and billing system 212 to review the consolidated billing statement 206. In various embodiments, computing devices 204 may comprise a personal computer, a laptop computer, or a tablet computer. The computing devices 204 may also comprise a personal digital assistant (PDA), a mobile telephone, or any other suitable device operable to display the consolidated billing statement 206 and establish a connection with network 162.

In one embodiment, the consolidated billing statement 206 also comprises purchase transactions initiated using a purchase card 'A' 222, 'B' 232, and 'n' 242, respectively, issued by vendor A' 220, 'B' 230, and 'n' 240 to the account holder 202. In various embodiments, account holder 202 reviews the consolidated billing statement 206 and selectively enters a payment amount for vendors A' 220, 'B' 230, and 'n' 240. Once payment amounts are entered for each of the selected vendors A' 220, 'B' 230, and 'n' 240, the account holder 202 initiates payment instructions 250. The initiation of the payment instructions 250 results in the service provider generating payment funds instructions 252 for the withdrawal of payment funds from a designated funding account in the account holder's bank 254, which are in turn are transferred to each vendor's bank A' 226, 'B' 236, and 'n' 246. Upon receipt of the payment, the vendors A' 220, 'B' 230, and 'n' 240 update their billing and payment information. Skilled practitioners of the art will recognize that many such embodiments are possible.

Figure 3:
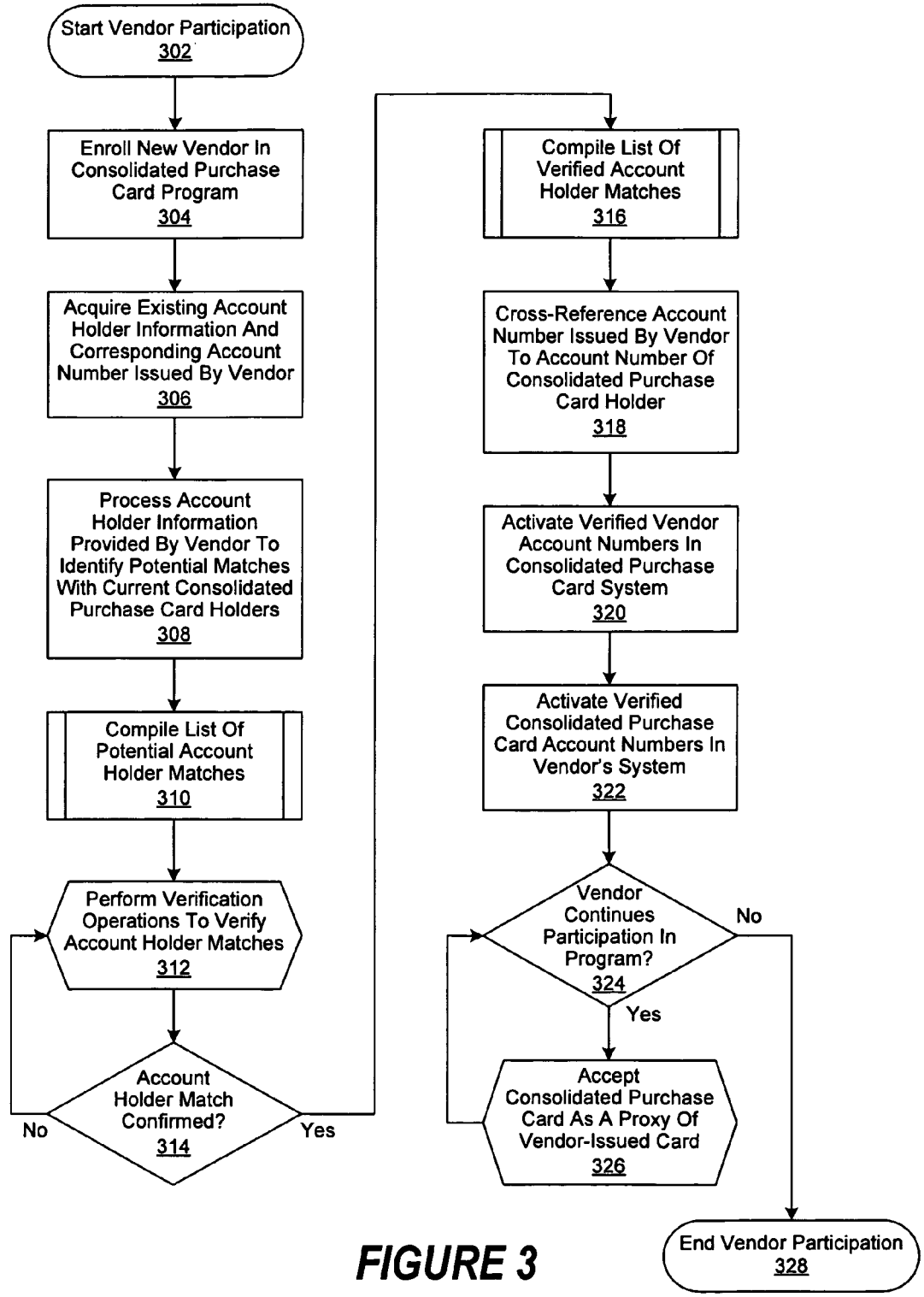
FIG. 3 is a generalized flowchart of a consolidated purchase, payment, and billing system as implemented for vendor participation.

FIG. 3 is a generalized flowchart of a consolidated purchase, payment, and billing system as implemented for vendor participation. In this embodiment, a vendor's participation in a consolidated purchase, payment, and billing system begins in step 302, followed by the vendor enrolling with a consolidated purchase and billing service provider in step 304 for the acceptance of a consolidated purchase card. In step 306, account holder information, including account numbers associated with purchase cards issued by the vendor, is acquired. As utilized herein, an account number of a purchase card issued by a vendor is a unique identifier that references transaction parameters between the vendor and the account holder. The vendor's account holder information is then processed in step 308 to identify potential matches between account holders who are currently a holder of a consolidated purchase card and who are also a holder of a purchase card issued by the vendor. A list of possible matches is then compiled in step 310. Verification operations are then performed in step 312 to verify the identity and match of dual account holders. As an example, if the two account holders have the same name, the same Social Security Number, the same address, and the same billing phone number, then the likelihood of the match is high. However, it will be apparent that two account holders having the same name, the same address, the same billing phone numbers, but different Social Security Numbers may be related, but are not a match. A decision is made in step 314 whether there is a verified match between two account holders. If the verification fails, the process is continued by proceeding to step 312. However, if there is a match between two account holders, the account holder is appended to a list of verified dual account holders in step 316.

Once the verified dual account holder list is compiled, the account number of the dual account holder's consolidated purchase card account is acquired. As utilized herein, an account number of a consolidated purchase card issued by a service provider is a unique identifier that references transaction parameters between the service provider and the account holder. The unique identifier of the vendor purchase card account is then cross-referenced to the unique identifier of the consolidated purchase card (e.g., the consolidated purchase account number) in step 318. As an example, a third unique identifier, such as the Social Security Number of the dual account holder, can serve as an index key for the cross-reference. As utilized herein, the cross-referencing of the unique identifiers of the vendor purchase card account and the consolidated purchase card account references transaction parameters between the vendor and the service provider. Once the unique identifiers are cross-referenced, the verified vendor account holders are activated in the consolidated purchase, payment, and billing system in step 320. The unique identifiers are then similarly activated in the vendor's systems in step 322. In various embodiments, these systems may include functionality for the issuance and maintenance of purchase cards, transaction processing, accounting, billing and other functions familiar to those of skill in the art. A decision is then made in step 324 regarding whether the vendor continues participation in the acceptance of a consolidated purchase card. If so, then the vendor continues to accept the unique identifier of the consolidated purchase card as a proxy of the unique identifier of a purchase card they issue. The process then is continued by proceeding to step 326, where if the vendor decides to no longer accept the consolidated purchasing card, their participation ends in step 328.

Figure 4:
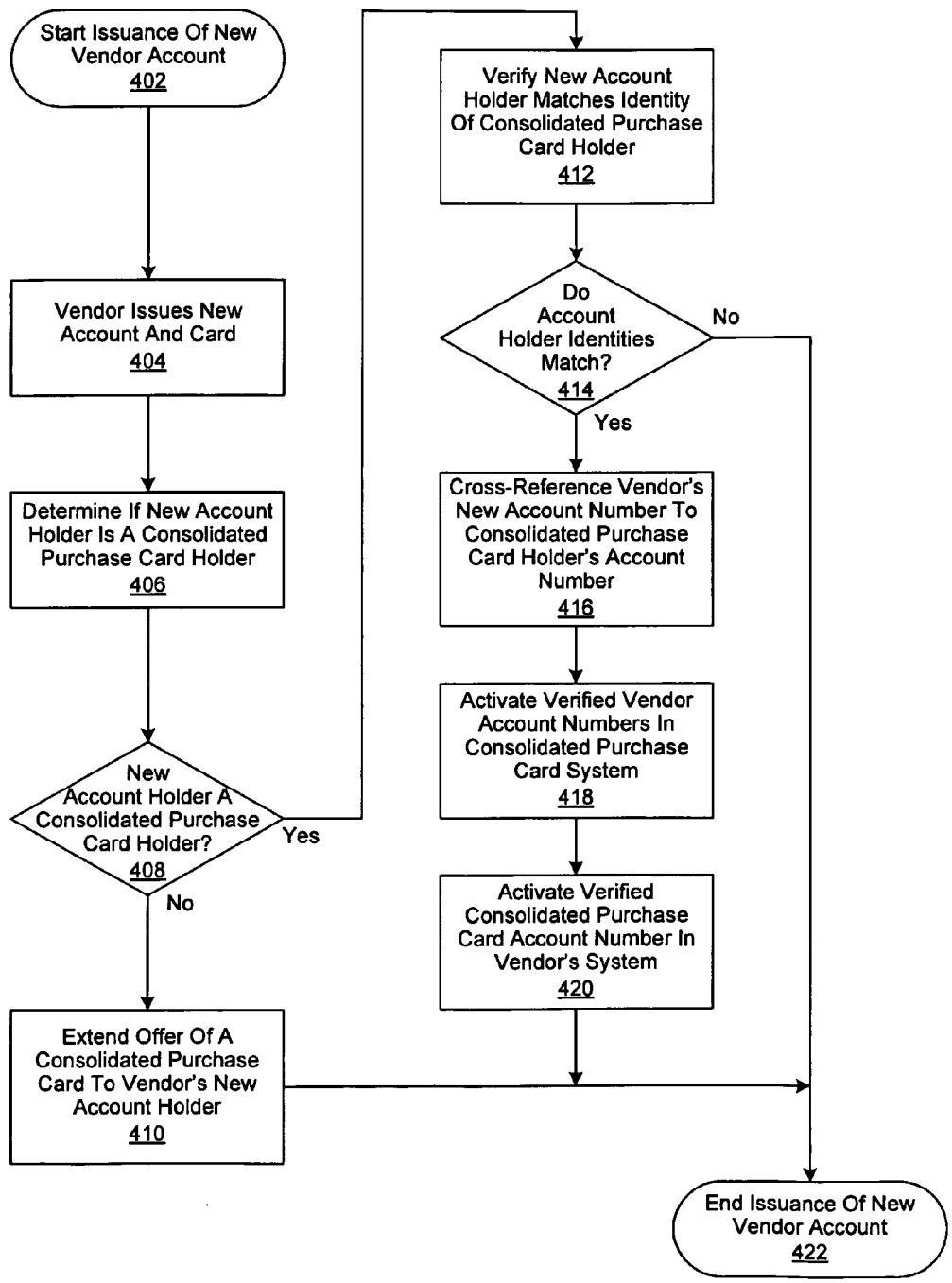
FIG. 4 is a generalized flowchart of a consolidated purchase, payment, and billing system as implemented for issuance of a new vendor account.

FIG. 4 is a generalized flowchart of a consolidated purchase, payment, and billing system as implemented for issuance of a new vendor account. In this embodiment, it is presumed that the existing account holders of a vendor purchase card account that have been determined to also be a consolidated purchase account holder have been verified and cross-referenced as described in greater detail in FIG. 3. However, a similar verification and cross-reference process is used if the vendor issues a new purchase card account. Accordingly, the issuance of a new vendor purchase card account begins in step 402, followed by step 404, where the vendor initiates a new purchase card account and issues a purchase card to the new account holder. In step 406, a decision is made, similar to the processes described in FIG. 3, whether the new vendor purchase card account holder is currently a holder of a consolidated purchase card.

A decision is then made in step 408 whether there is a match. If it is decided in step 408 that the new holder of a vendor purchase card account is not currently a holder of a consolidated purchase card account, then an offer is extended in step 410 for them to become one. Thereafter, the issuance of a new vendor purchase card account is ended in step 422. Otherwise, verifications processes, similar to those described in FIG. 3, are performed in step 412 to verify that there is a match between the new holder of the vendor purchase card account and the holder of a consolidated purchase card account. If it is decided in step 414 that there is not a match, then the issuance of a new vendor purchase card account is ended in step 422. Otherwise, as likewise described in FIG. 3, the unique identifier of the newly-issued vendor purchase card account is cross-referenced in step 416 to the unique identifier of dual account holder's consolidated purchase card account. The verified vendor purchase card account holder is then activated in the consolidated purchase, payment, and billing system in step 418, followed by a similar activation in the vendor's systems in step 420. Once activations are complete, the issuance of a new vendor purchase card account is ended in step 422.

Figure 5:
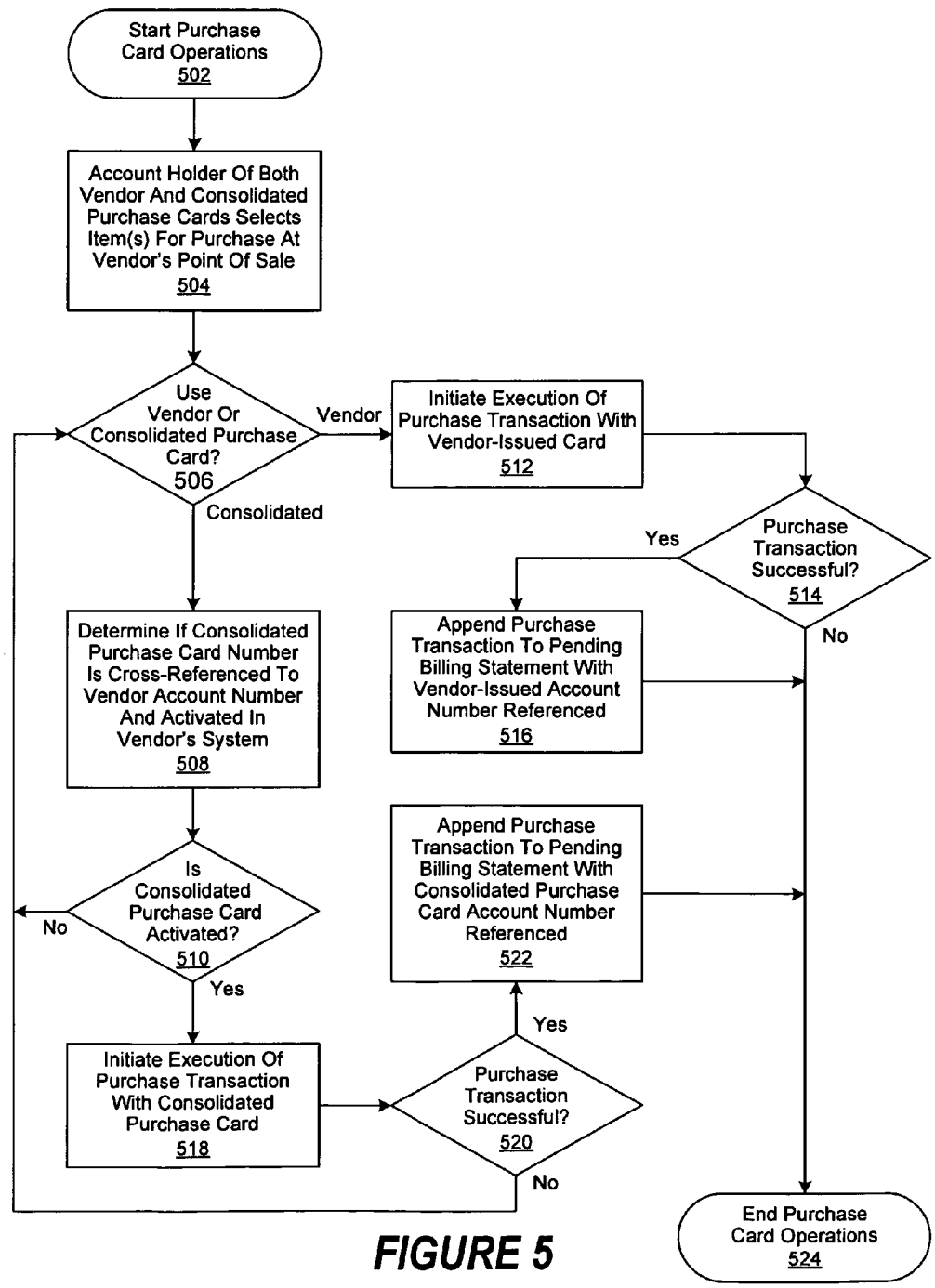
FIG. 5 is a generalized flowchart of a consolidated purchase, payment, and billing system as implemented for consolidated purchasing.

FIG. 5 is a generalized flowchart of a consolidated purchase, payment, and billing system as implemented for consolidated purchasing. In this and other embodiments, purchase card operations are begun in step 502. An account holder of both a consolidated purchase card and a vendor-issued purchase card selects items for purchase in step 504 at a vendor's point of sale. A decision is then made by the dual account holder in step 506 whether to initiate purchase of the selected items with a consolidated purchase card or a purchase card issued by the vendor. If it is decided to initiate purchase with the consolidated purchase card, then operations are performed in step 508 to determine if the submitted consolidated purchase card is cross-referenced to a vendor-issued purchase card and is activated within the vendor's systems. If it is decided in step 510 that the consolidated purchase card is not activated in the vendor's systems, then the process is continued by proceeding to step 506. Otherwise, execution of the purchase transaction for the selected items is initiated in step 518 with the consolidated purchase card. A decision is then made in step 520 if the purchase transaction was successfully completed. If so, then the purchase transaction is appended to the vendor's pending billing statement for the dual account holder in step 522. In one embodiment, the unique identifier of the consolidated purchase card (e.g., its card number), and the unique identifier of the vendor purchase card, are cross-referenced to a unique identifier (e.g., a transaction number) associated with the purchase transaction. After the purchase transaction is appended, purchase card operations are ended in step 524. However, if the purchase transaction was not successful, then the process is continued by proceeding to step 506.

If it is decided in step 506 to initiate purchase with the vendor-issued purchase card, then execution of the purchase transaction for the selected items is initiated in step 512 with the vendor-issued purchase card. A decision is then made in step 514 whether the purchase transaction was successful. If so, then the purchase transaction is appended to the vendor's pending billing statement for the account holder. After the purchase transaction is appended, or if it is decided in step 514 that the purchase transaction was not successful, purchase card operations are ended in step 524.

Figure 6A:
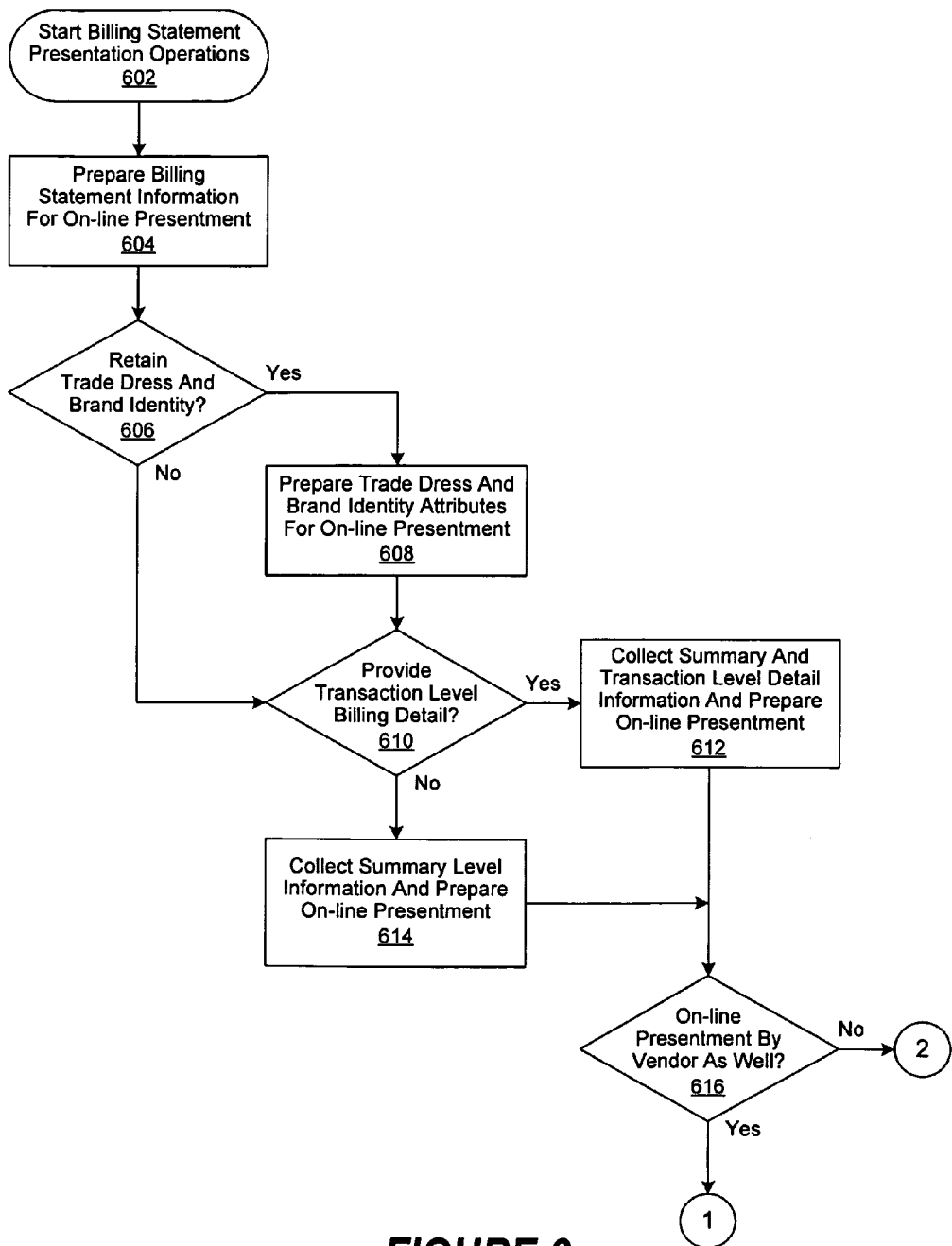
FIGS. 6a-b are a generalized flowchart of a consolidated purchase, payment, and billing system as implemented for bill presentment.
Figure 6B:
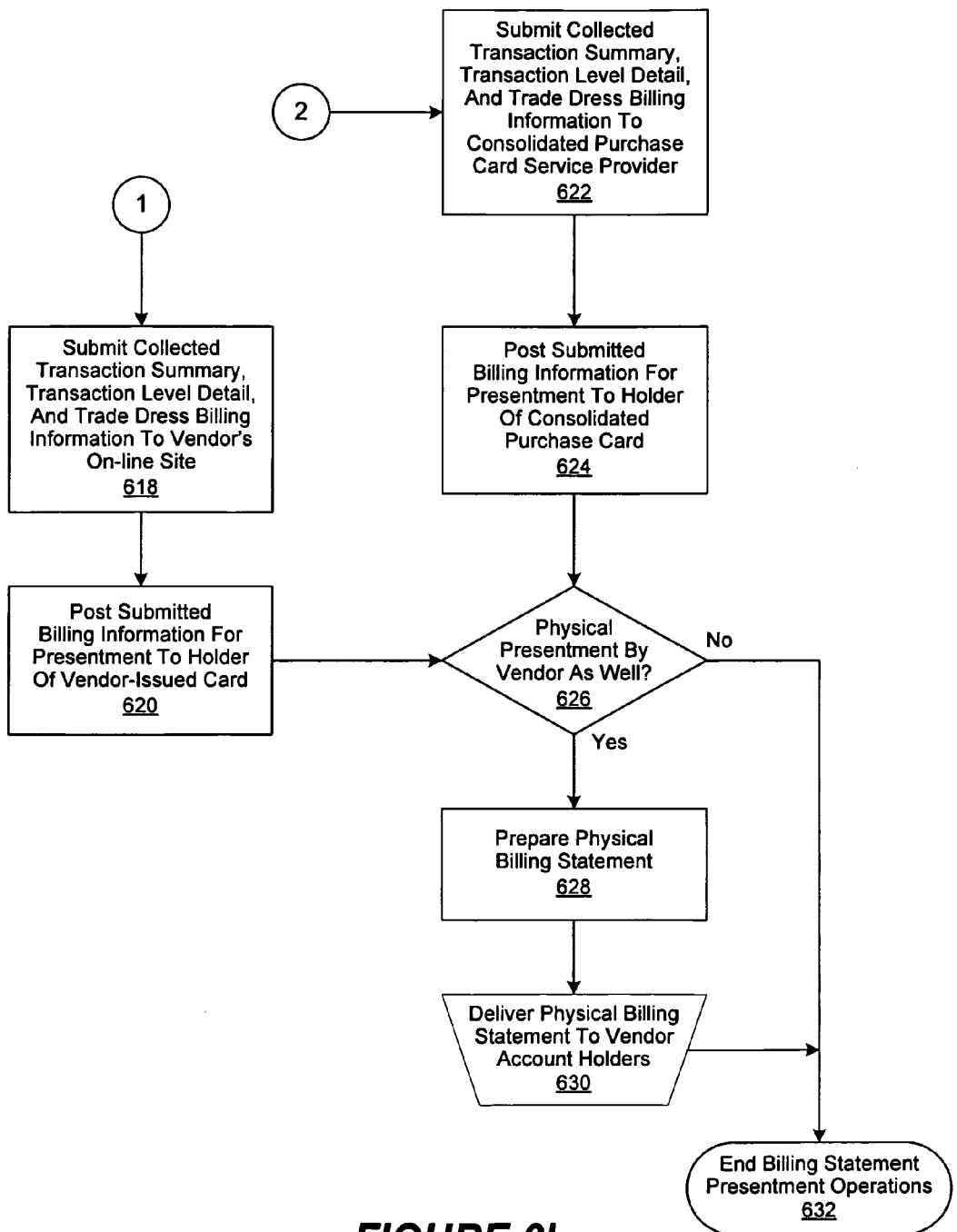

FIGS. 6a-b are a generalized flowchart of a consolidated purchase, payment, and billing system as implemented for bill presentment in accordance with an embodiment of the disclosure. In this embodiment, bill statement presentation operations are begun in step 602, followed by the preparation of billing information for on-line presentation in step 604. As used herein, such preparation refers to the structuring and formatting of information as utilized for its on-line presentment. In one embodiment, the preparation of the billing information is performed by a vendor who has an association with a service provider that is providing the consolidated purchase, payment, and billing system. In yet another embodiment, preparation of the billing information is shared between the vendor and the service provider.

A decision is then made in step 606 as to whether the vendor's trade dress and brand identity will be retained in the on-line presentation of the vendor's billing statement. In various embodiments, trade dress includes the vendor's trademarks, logotypes, color schemes, the format of a printed bill, and other items of trade dress known to those of skill in the art. It will also be appreciated that a vendor would reinforce their brand identity by having the on-line presentation of their billing statements be synonymous with their corresponding printed versions. If it is decided in step 606 to retain the vendor's trade dress and brand identity during on-line presentation of their billing statement, then additional preparation operations are performed on the billing information in step 608. As an example, the vendor may wish to include an on-line promotion, featuring their logo and color scheme, as part of the on-line presentation of the billing statement.

Once the additional preparation operations are completed, or if it is decided in step 606 to not include the vendor's trade dress in the on-line presentation of the billing statement, a decision is made in step 610 to include transaction level billing detail. If not, then summary level billing information is collected and prepared for on-line presentation in step 614. Otherwise, both summary and transaction level detail is collected and prepared for on-line presentation in step 612. In one embodiment, a first level of transaction detail, often referred to as "Level 1" detail, is collected. In this embodiment, the first level of transaction detail typically includes the purchase transaction date, a unique transaction identifier, and a total amount for the purchase transaction. The first level of transaction detail may also include the account number of the purchase card used to initiate the transaction. In addition, first level transaction detail may include the location where the purchase transaction originated, such as city, state, or even store number or address. In another embodiment, a second level of transaction detail, often referred to as "Level 2" detail, is collected. In this embodiment, the second level of transaction detail typically includes a description of each item purchased, the quantity purchased, the individual cost for each item, and its extended cost.

Whether summary-only or summary and transaction detail billing information is respectively collected and prepared in step 614 and 612, a decision is made in step 616 as to whether the vendor will also present the billing statement. If so, then the billing information that was collected and prepared in the foregoing steps is submitted to the vendor's on-line billing presentment site in step 618. Once submitted, the billing statement is posted to the vendor's on-line billing presentment site in step 620 for presentation to holders of vendor-issued purchase cards. However, if the vendor's billing statement will only be presented by the consolidated purchase and billing service provider, then the billing information that was collected and prepared in the foregoing steps is submitted to the vendor's on-line billing presence in step 622. Once submitted, the billing statement is posted to the service provider's on-line billing presence in step 624 for presentation to dual holders of vendor-issued and consolidated purchase cards. A decision is then made in step 626 whether the vendor will also present a physical copy of the billing statement to the dual account holder as well. If not, then billing statement presentment operations are ended in step 632. Otherwise, a physical billing statement is prepared in step 628 and then delivered to the holder of the vendor account in step 630. Once the physical billing statement is delivered, billing statement presentment operations are ended in step 632.

Figure 7C:
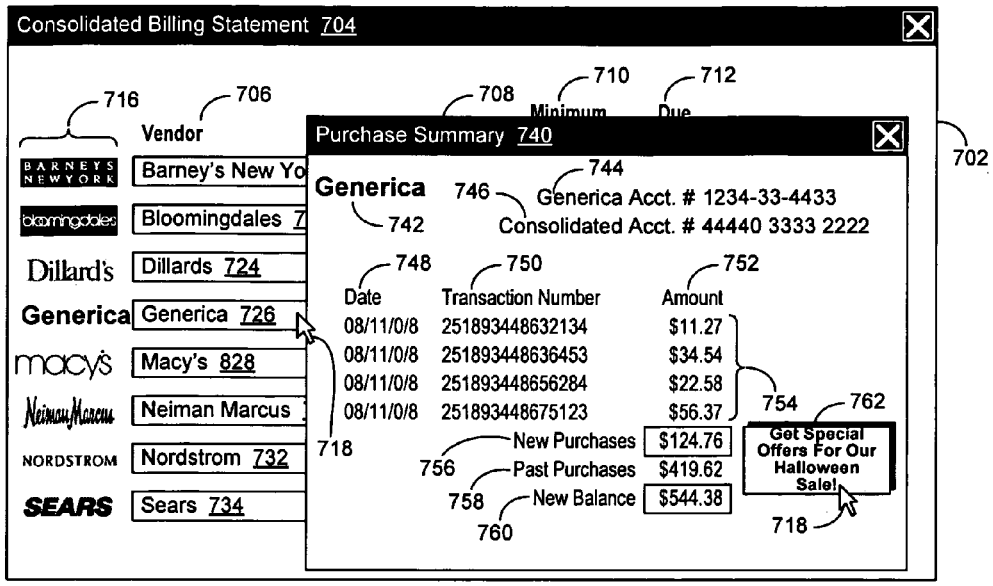

FIGS. 7a-d are a simplified illustration of a consolidated purchase, payment, and billing system as implemented to display vendor trade dress and transaction detail within a user interface (UI). Referring to FIG. 7a, summary level billing information is provided for a plurality 714 of vendors 706. In this embodiment, a consolidated billing statement 704 is presented within user interface (UI) window 702. The consolidated billing statement 704 comprises a plurality 714 of vendors 706 and their corresponding account balances 708, minimum payments due 710 and payment due date 712. As illustrated in FIG. 7a, consolidated billing statement vendors 706 comprise "Barney's New York" 720, "Bloomingdales" 722, "Dillards" 724, "Generica" 726, "Macy's" 728, "Neiman Marcus" 730, "Nordstrom" 732, and "Sears" 734. In this embodiment, an account holder of a consolidated purchase card is able to review summary level information of a billing statement from a vendor that accepted the unique identifier of a consolidated purchase card account as a proxy of the unique identifier of a purchase card they issued. As an example, the account holder would be able to see that their account balance 708 for "Nordstrom" 732 is $899.45, with a minimum payment due 710 of $125.00 on a due date 712 of Sep. 24, 2008.

Referring now to FIG. 7b, trade dress, in the form of vendor logos 716, has been added to the consolidated billing statement 704 presented within UI window 702. Similarly, as illustrated in FIG. 7c, a first level of transaction detail has been provided within the Purchase Summary window 740. In this embodiment, the Purchase Summary window is revealed through a user gesture, such as placing cursor 718 on a summary level information line for a vendor (e.g., "Generica" 726), followed by a left mouse-click. Purchase Summary window 740 comprises trade dress in the form of the vendor's logo 742, the vendor-issued purchase card account number 744, and a consolidated purchase card account number 746. The Purchase Summary window 740 further comprises a plurality of transactions 754, each of which has a purchase date 748, a unique transaction number 750, and a transaction purchase amount 752. In addition, the Purchase Summary window 740 comprises a total for new purchases 756, a total for past purchases 758, a new balance total 760, and a vendor promotion offer 762. In various embodiments, vendor promotion offer 762 is invoked through a user gesture, such as by using the cursor 718 and a left mouse-click. In one embodiment, the user gesture results in the opening of a Web page. In another embodiment, the user gesture results in a binary image (e.g., jpg, bmp, tiff, pdf) being displayed.

Figure 7D:
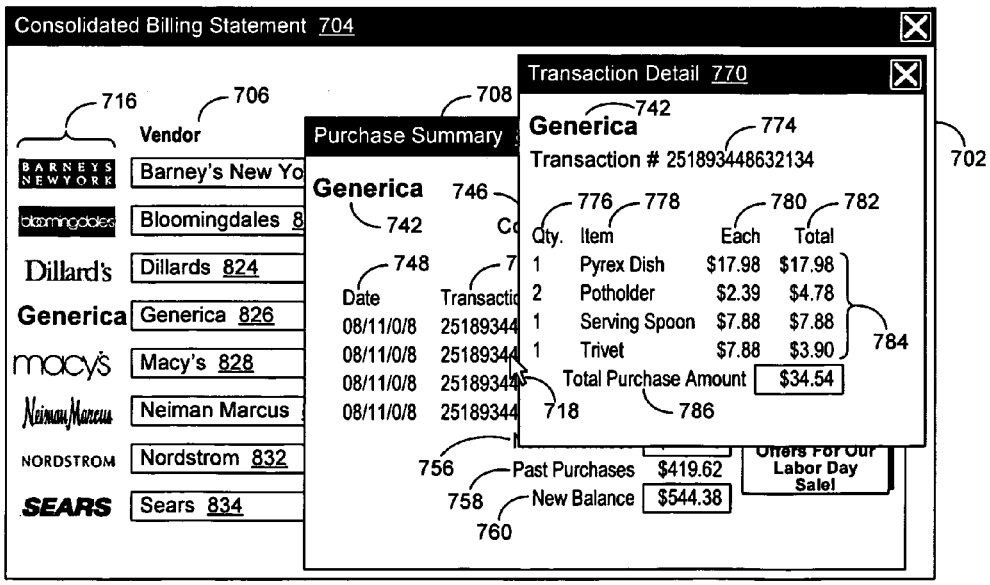

Referring now to FIG. 7d, a second level of transaction detail has been provided within the Transaction Detail window 770. In this embodiment, the Transaction Detail window is revealed through a user gesture, such as placing cursor 718 on a purchase transaction (e.g., #251893448632134 as illustrated in the Purchase Summary window 740), followed by a left mouse-click. Transaction Detail window 770 similarly comprises trade dress in the form of the vendor's logo 742, and the aforereferenced transaction number "251893448632134" 774. The Transaction Detail window 770 further comprises a plurality of purchased items 784, each of which has a quantity 776, an item description 778, a unit price 780, extended cost 782, and a total purchase amount 786.

Figure 8A:
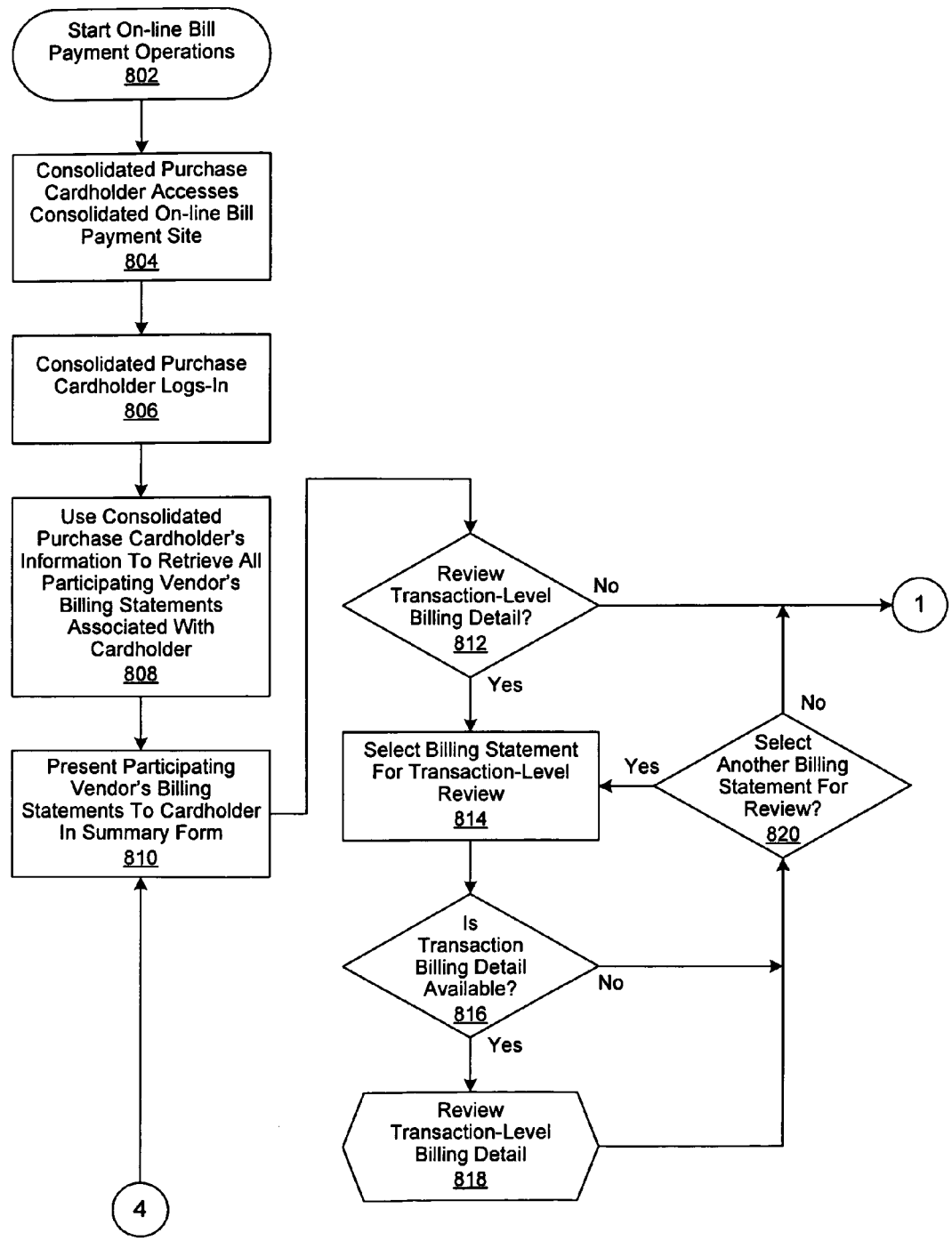
FIGS. 8a-c are a generalized flowchart of a consolidated purchase, payment, and billing system as implemented for on-line bill payment.
Figure 8B:
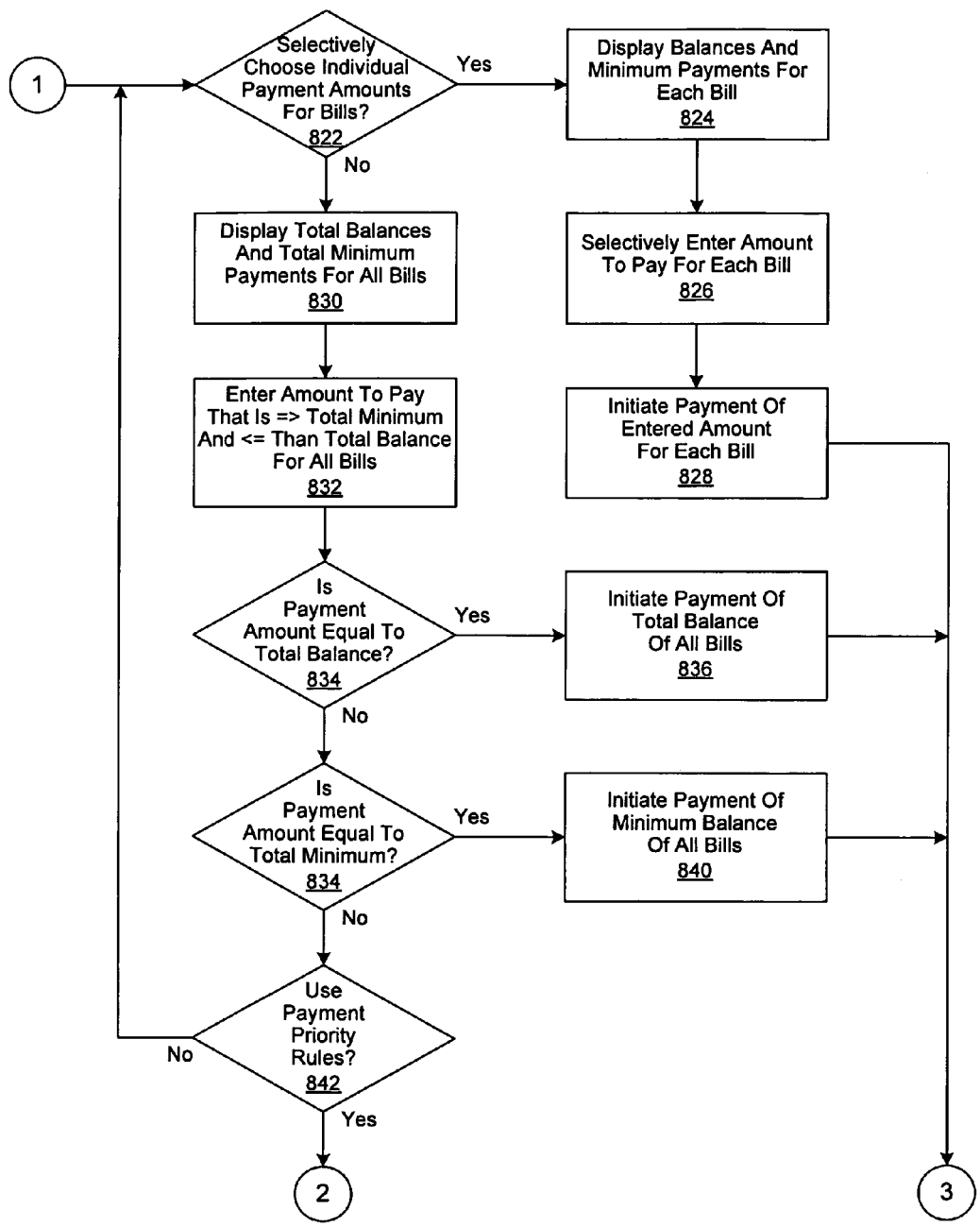
Figure 8C:
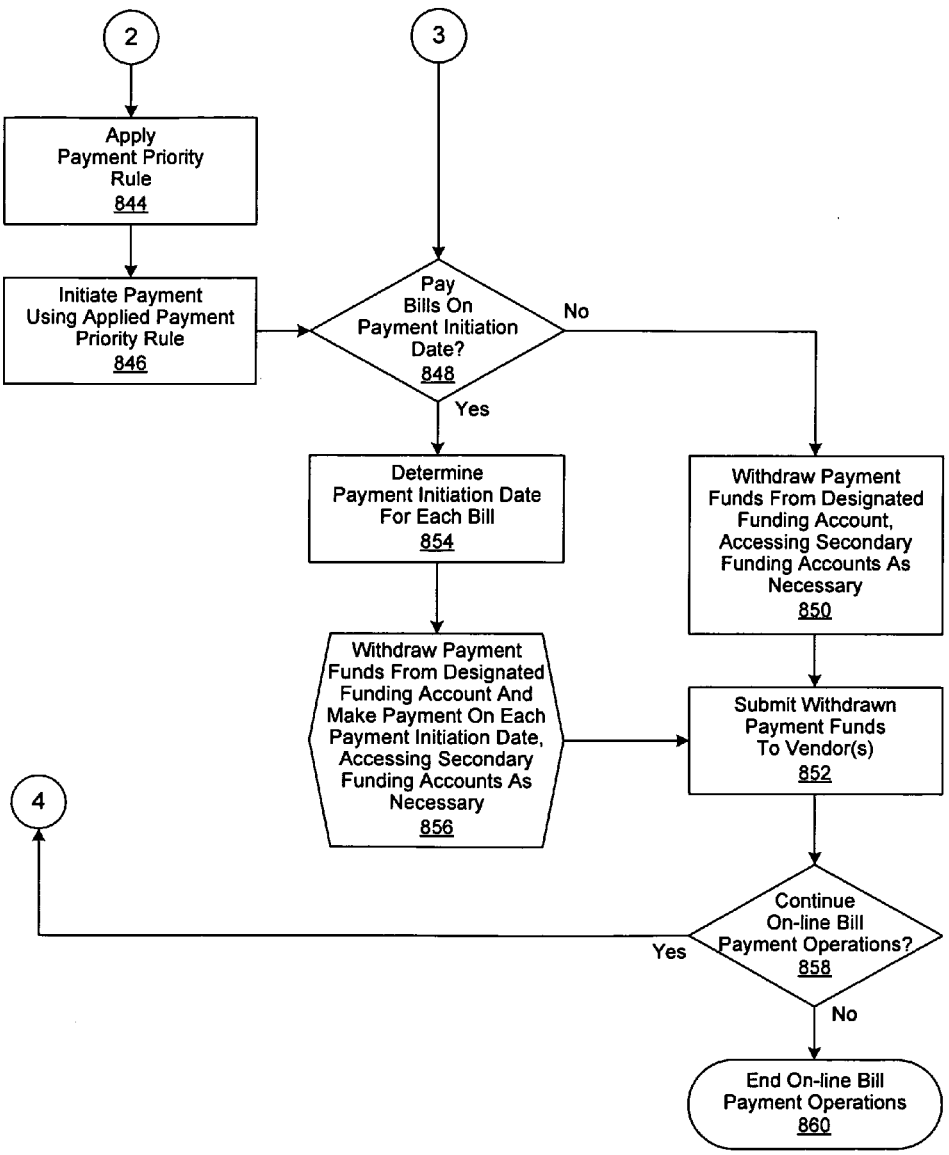

FIGS. 8a-c are a generalized flowchart of a consolidated purchase, payment, and billing system as implemented for on-line bill payment. In this embodiment, on-line payment of billing statements is begun in step 802, followed by a holder of a consolidated purchase card account accessing a consolidated purchase and billing site in step 804. In step 806 the holder of a consolidated purchase card account logs in. The account holder's log-in information is then used in step 808 to retrieve billing statements from vendors that have issued their own purchase card account to the account holder. Once retrieved, the individual billing statements from the different vendors are aggregated at a summary information level into a consolidated billing statement and presented to the account holder in step 810. A decision is then made in step 812 whether to review an individual vendor's billing statement at a transaction level detail. If so, a vendor's billing statement is selected for transaction-level review in 814. A decision is then made in step 816 whether transaction level billing detail has been provided by the vendor. If so, then details of the vendor's billing statement are reviewed in step 818 at the transaction level as described in greater detail herein. However, if transaction level billing detail has not been provided by the vendor, then a decision is made in step 820 as to whether a different vendor's billing statement is to be selected for review of transaction level billing detail. If so, then the process is continued by proceeding to step 814.

Otherwise, or if it is decided in step 812 to not review vendor's billing statements at the transaction detail level, then a decision is made in step 822 whether to selectively choose the amount to pay each vendor. If so, then the outstanding balances and minimum payment amounts for each vendor's billing statement are displayed in step 824. Once displayed, as described in greater detail herein, the account holder enters the payment amount to be applied to each vendor's billing statement in step 826. Payment for the amount selected for each vendor's billing statement is then initiated in step 828, followed by a decision in step 848 whether the selected billing statements are to be paid on individually designated payment initiation dates, or all at once, at the present. If it is decided to pay the selected bills all at once, at the present, then payment funds are withdrawn from a designated funding account in step 850. Once withdrawn from the funding account(s), the payment funds are submitted to the respective vendor(s) in step 852. A decision is then made in step 858 whether to continue on-line bill payment operations. If so, then the process is continued by proceeding to step 810. Otherwise, on-line bill payment operations are ended in step 860.

However, if it is decided in step 848 to pay selected billing statements on individually designated payment initiation dates, then a payment initiation date for each of the selected billing statements is decided in step 854. Once decided, then payment funds are withdrawn from a designated funding account in step 856 prior to the payment initiation date for each of the selected billing statements. In various embodiments, funds for each of the selected billing statements are withdrawn from the designated funding account prior to their respective payment due date. In one embodiment, a primary funding account is designated by the account holder. In another embodiment, a secondary funding account is designated if there are insufficient funds available in the primary funding account. In yet another embodiment, funds from multiple funding accounts are combined if the funds available in any or all of the funding accounts are insufficient. In still another embodiment, different funding accounts are designated to provide payment funds for payment of different vendor's billing statements. It will be apparent to those of skill in the art that many such embodiments are possible and the foregoing are not intended to limit the scope or spirit of the disclosure. Once withdrawn from the funding account(s), the payment funds are submitted to the respective vendor(s) in step 852. A decision is then made in step 858 whether to continue on-line bill payment operations. If so, then the process is continued by proceeding to step 810. Otherwise, on-line bill payment operations are ended in step 860.

However, if it is decided in step 822 to not pay each vendor's billing statement separately, then the total balances and the total minimum balances for all vendors are displayed in step 830. A total payment amount, greater than or equal to the total minimum balances of all billing statements, and less than or equal to the total balances of all billing statements, is entered by the account holder in step 832. A decision is then made in step 834 whether the payment amount entered by the account holder is equal to the total balances for all vendors. If so, then payment is initiated for paying the total balance for all vendors in step 836, with the process continuing, proceeding with step 848 as described in more detail hereinabove. Otherwise, a decision is then made in step 834 whether the payment amount entered by the account holder is equal to the total minimum balances for all vendors. If so, then payment is initiated for paying the total minimum balances for all vendors in step 840, with the process continuing, proceeding with step 848 as described in more detail hereinabove.

However, if it is decided in step 838 that the payment amount entered by the account holder is not equal to the total minimum balances for all vendors, then a decision is made in step 842 whether to use a predefined payment priority rule. If it is decided in step 842 to not use a predefined payment priority rule, then the process is continued by proceeding to step 822. Otherwise, a payment priority rule is applied in step 844. As utilized herein, a payment priority rule comprises instructions that are applied to one or more billing statements to generate a payment priority value. In various embodiments, payment funds are applied to billing statements assigned a higher payment priority value sooner than billing statements assigned a lower payment priority value. In one embodiment, a payment priority rule is defined to apply an amount of a total payment first to the minimum balance due to each of a group of vendors. The balance of the total payment amount is then proportionately distributed to any outstanding, remaining balances of each vendor. In another embodiment, the balance of the total payment amount can be applied to the highest outstanding vendor account balance, or the vendor account balance with the highest interest rate.

In yet another embodiment, a payment rule is applied to the payment due date of a plurality of billing statements. Those billing statements with an earlier due date are assigned a higher payment priority value than those with a later due date. In one embodiment, a payment rule is applied to the outstanding balance of a plurality of billing statements. Those billing statements with a higher outstanding balance are assigned a higher payment priority value than those with a lower outstanding balance. In yet another embodiment, a payment rule is applied to the interest rate charged for the unpaid balances of a plurality of billing statements. Those billing statements with a higher interest rate are assigned a higher payment priority value than those with a lower interest rate. In other embodiments, different funding accounts are designated for billing statements with different payment priority values. It will be apparent to those of skill in the art that many such embodiments are possible. Once the payment allocation rule has been selected in step 844, payment is initiated using the selected allocation rule, in step 846. Thereafter, the process continues, as described in greater detail hereinabove, proceeding with step 848.

Figure 9:
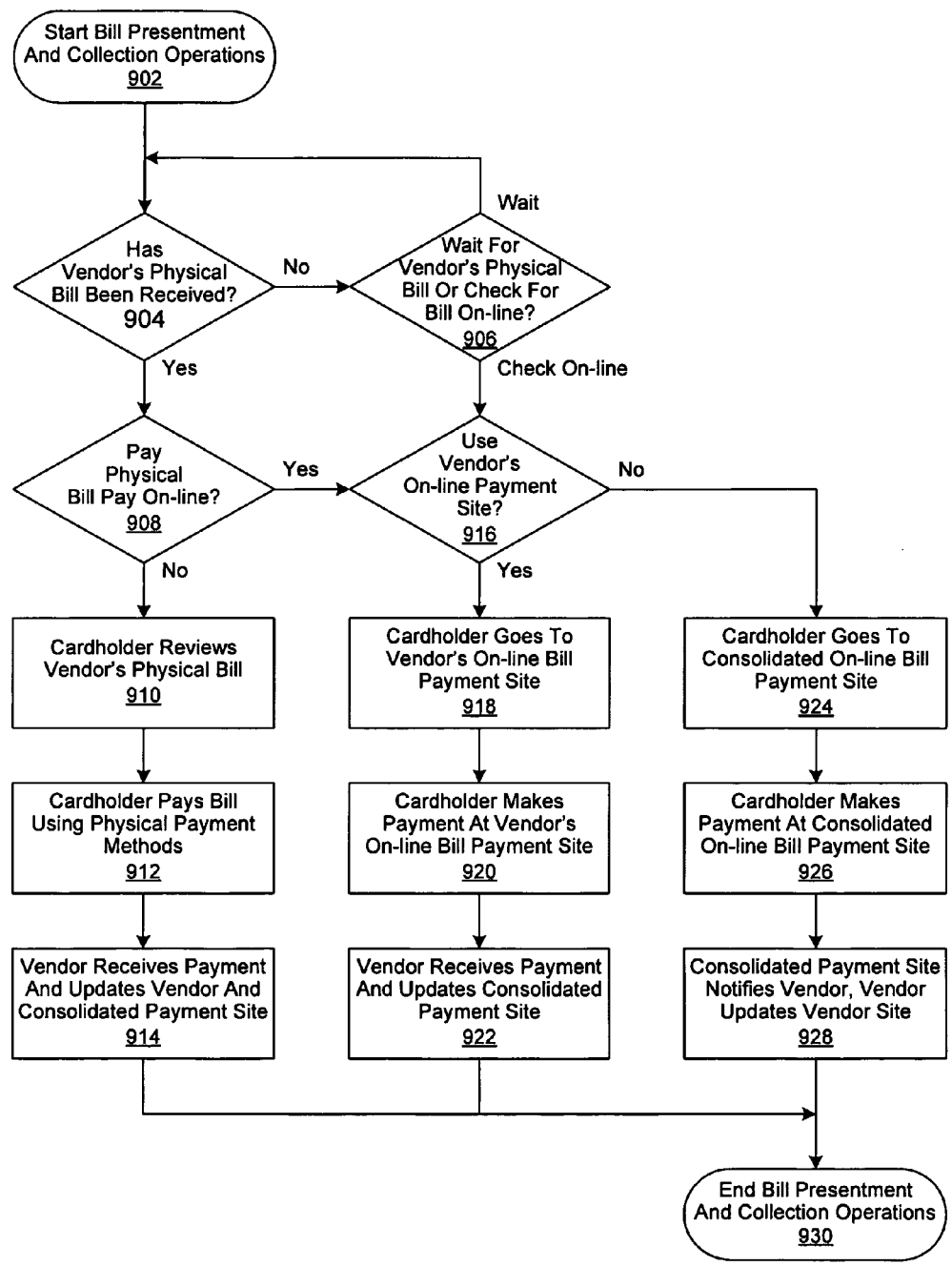
FIG. 9 is a generalized flowchart of a consolidated purchase, payment, and billing system as implemented for vendor payment collection.

FIG. 9 is a generalized flowchart of a consolidated purchase, payment, and billing system as implemented for vendor payment collection. In this embodiment, vendor billing statement presentment and collection operations begin in step 902. Following, in step 904, a decision is made whether a physical bill of a vendor who accepts consolidated purchase cards has been received by a consolidated purchase account holder. If not, then a decision is made in step 906 whether to wait for receipt of the vendor's bill or to check for the presence of the vendor's bill on-line. If it is decided in step 906 to wait for the vendor's physical bill, then the process is continued by proceeding to step 904.

However, if the vendor's physical bill has been received, a decision is made in step 908 whether to pay the physical bill using physical payment methods, such as by check. If a physical payment method is chosen in step 908, then the account holder reviews the vendor's physical bill in step 910 and then uses physical payment methods to make a payment on step 912. Subsequently, the vendor receives payment. In one embodiment, the vendor does not operate an on-line bill payment site. As a result, the vendor updates the consolidated billing service provider with the received payment information in step 914. Accordingly, the billing statement presented to the account holder on behalf of the vendor is updated. In another embodiment, the vendor operates their own on-line bill payment site as well. Accordingly, the account holder's billing statement at the vendor's site is likewise updated with the received payment information. Vendor billing statement presentment and collection operations are then ended in step 930.

However, if it is decided in step 906 to check on-line for the presence of the vendor's billing statement, or if it is decided in step 908 to pay a physical bill on-line, then a decision is made in step 916 whether to use the vendor's on-line bill payment site. If so, then the account holder proceeds to the vendor's on-line payment site in step 918 and makes an on-line payment in step 920. The vendor receives the on-line payment in step 922 and then updates their internal systems, their on-line bill payment site, and the consolidated billing service provider's site. Vendor billing statement presentment and collection operations are then ended in step 930.

However, if it is decided in step 916 to not use the vendor's on-line bill payment site, then the account holder proceeds to the consolidated billing service provider's site in step 924 and makes an on-line payment in step 926. The consolidated billing service provider receives the on-line payment in step 928 and then updates their internal systems and notifies the vendor of the received payment. In one embodiment, the consolidated billing service provider updates the vendors on-line bill payment. Vendor billing statement presentment and collection operations are then ended in step 930.

Figure 10:
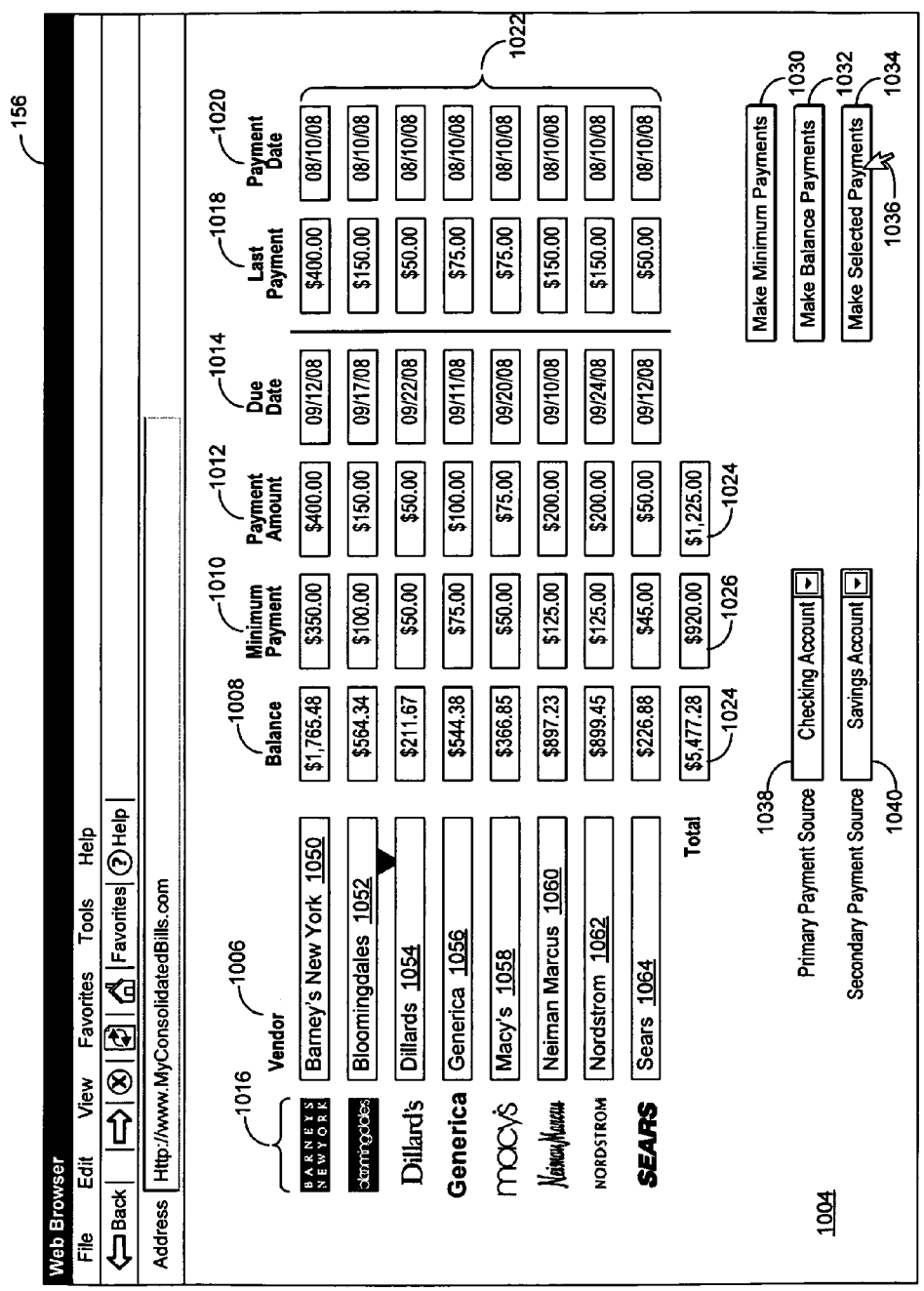
FIG. 10 is a simplified illustration of a consolidated billing statement as implemented within a user interface (UI).

FIG. 10 is a simplified illustration of a consolidated billing statement as implemented within a user interface (UI). In this embodiment, a consolidated billing statement 1004 is implemented within browser 156 to present billing statement summary information aggregated for a plurality 1022 of vendor 1006 billing statements. The consolidated billing statement 1004 comprises a plurality 1022 of vendors 1006 and their corresponding account balances 1008, minimum payments due 1010 and payment due date 1014, last payment amount 1018, and last payment date 1020. As illustrated in FIG. 10, consolidated billing statement vendors 1006 comprise "Barney's New York" 1050, "Bloomingdales" 1052, "Dillards" 1054, "Generica" 1056, "Macy's" 1058, "Neiman Marcus" 1060, "Nordstrom" 1062, and "Sears" 1064. In addition, trade dress, in the form of vendor logos 1016, has been added to the consolidated billing statement 1004 presented within browser 156.

In this embodiment, an account holder of a consolidated purchase card is able to review summary level information of a billing statement from a vendor that accepted the unique identifier of a consolidated purchase card account as a proxy of a unique identifier of a purchase card they issued. As an example, the account holder would be able to see that their account balance 1008 for "Nordstrom" 1062 is $899.45, with a minimum payment due 1010 of $125.00 on a due date 1014 of Sep. 24, 2008.

In one embodiment, the consolidated purchase card holder selectively enters a payment amount 1012 for each of the plurality 1022 of vendors 1006. Once the payment amounts 1012 are entered, a selected payment amount total 1024 is displayed. As illustrated in FIG. 10, the total 1024 for the selected payments is $1,225.00. Once payment amounts are selected for each of the selected vendors, the account holder initiates payment through a user gesture, such as by placing cursor 1036 over the Make Selected Payments command button 1034, followed by a left mouse-click.

In another embodiment, the minimum payments total 1026 is paid by using a similar user gesture with the Make Minimum Payments command button 1030. As illustrated in FIG. 10, the minimum payments total 1026 of $920.00 would be distributed to each vendor according to their respective minimum payment. As an example, "Macy's" 1058 would receive $50.00 of the $920.00 total, while "Barney's New York" 1050 would receive $350.00. In one embodiment, the outstanding balance total 1024 of all vendors 1006 is paid by using a similar user gesture with the Make Balance Payments command button 1032. As illustrated in FIG. 10, the balance payments total 1024 of $5,477.28 would be distributed to each vendor according to their respective outstanding balance payment. To continue the prior example, "Macy's" 1058 would receive $366.85 of the $5,477.28 total, while "Barney's New York" 1050 would receive $1,765.48.

In one embodiment, the initiation of payment results in the withdrawal of payment funds from a designated funding account, such as "Checking Account" displayed in the Primary Payment Source window 1038. In another embodiment, a secondary funding account, such as "Savings Account" displayed in the Secondary Payment Source window 1040, is designated if there are insufficient funds available in the primary funding account. In yet another embodiment, different funding accounts are designated to provide payment funds for payment of different vendor's billing statements. It will be apparent to those of skill in the art that many such embodiments are possible and the foregoing are not intended to limit the scope or spirit of the disclosure.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation on the disclosure and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A system comprising:
   a processor;
   a data bus coupled to the processor; and
   a computer-usable medium embodying computer program code, the computer-usable medium being coupled to the data bus, the computer program code for managing purchase, billing and payment transactions and comprising instructions executable by the processor and configured for:

receiving instructions cross-referencing a consolidated purchase card having a unique identifier to each of a plurality of vendor accounts of the user having individual unique vendor account identifiers corresponding thereto, wherein the unique identifier is usable at vendor points of sale as a proxy for the individual unique vendor account identifiers for settlement of purchases by the user;

in response to a purchase request using the consolidated purchase card at a specific vendor's point of sale, determining whether the consolidated purchase card is cross-referenced to a vendor-issued account that is activated with the vendor;

in response to determining whether the consolidated purchase card is cross-referenced to a vendor-issued account that is activated with the vendor, initiating execution of the purchase using the consolidated purchase card;

thereafter, aggregating a plurality of such purchases using the consolidated purchase card into a consolidated billing statement comprising a plurality of individual billing statements, wherein each individual billing statement in said plurality of individual billing statements comprises at least one purchase transaction initiated using the unique identifier; and presenting said consolidated billing statement to said user for payment;

receiving payment instructions comprising a payment funds amount to be applied to each of said individual billing statements in said plurality of billing statements; and processing said payment instructions to initiate payment of said payment funds amount from an individual source account of said user to predetermined vendor accounts corresponding to individual vendors.

2. The system of claim 1, wherein said payment funds amount to be applied to each of said individual billing statements comprises at least one of:
a fixed payment funds amount due;
a minimum payment funds amount due;
a maximum payment funds amount due;
a variable payment funds amount; or
a calculated payment funds amount.

3. The system of claim 2, wherein said user selects a subset of said individual billing statements for said application of a payment funds amount.

4. The system of claim 2 wherein said user selects all of said individual billing statements in said plurality of billing statements for said application of a payment funds amount.

5. The system of claim 4, wherein the minimum payment funds amount due is applied to each of said individual billing statements in said plurality of billing statements.

6. The system of claim 4, wherein the maximum payment funds amount due is applied to each of said individual billing statements in said plurality of billing statements.

7. The system of claim 4, wherein at least one of said payment funds amounts is applied to each of said individual billing statements in said plurality of billing statements.

8. A computer-implementable method for managing purchase, billing and payment transactions, comprising:

processing logic executable by a processor to receive instructions cross-referencing a consolidated purchase card having a unique identifier to each of a plurality of vendor accounts of the user having individual unique vendor account identifiers corresponding thereto, wherein the unique identifier is usable at vendor points of sale as a proxy for the individual unique vendor account identifiers for settlement of purchases by the user;

processing logic executable by the processor to, in response to a purchase request using the consolidated purchase card at a specific vendor's point of sale, determine whether the consolidated purchase card is cross-referenced to a vendor-issued account that is activated with the vendor;

processing logic executable by the processor to, in response to determining whether the consolidated purchase card is cross-referenced to a vendor-issued account that is activated with the vendor, initiate execution of the purchase using the consolidated purchase card;

processing logic executable by the processor to thereafter, aggregate a plurality of such purchases using the consolidated purchase card into a consolidated billing statement comprising a plurality of individual billing statements, wherein each individual billing statement in said plurality of individual billing statements comprises at least one purchase transaction initiated using the unique identifier;

processing logic executable by the processor to present said consolidated billing statement to said user for payment;

processing logic executable by the processor to receive payment instructions comprising a payment funds amount to be applied to each of said individual billing statements in said plurality of billing statements; and processing logic executable by the processor to process said payment instructions to initiate payment of said payment funds amount from an individual source account of said user to predetermined vendor accounts corresponding to individual vendors.

9. The method of claim 8, wherein said payment funds amount to be applied to each of said individual billing statements comprises at least one of:
a fixed payment funds amount due;
a minimum payment funds amount due;
a maximum payment funds amount due;
a variable payment funds amount; or
a calculated payment funds amount.

10. The method of claim 9, wherein said user selects a subset individual billing statements in said plurality of billing statements for said application of payment funds amount.

11. The method of claim 9, wherein said user selects all of said individual billing statements for said application of payment funds amount.

12. The method of claim 11, wherein a minimum payment funds amount due is applied to each individual billing statement in said plurality of billing statements.

13. The method of claim 11, wherein the maximum payment funds amount due is applied to each individual billing statement in said plurality of billing statements.

14. The method of claim 11, wherein at least one of said payment funds amounts is applied to each of said individual billing statements in said plurality of billing statements.

15. A non-transitory computer-usable medium embodying computer program code, the computer program code comprising computer executable instructions configured for:

receiving instructions cross-referencing a consolidated purchase card having a unique identifier to each of a plurality of vendor accounts of the user having individual unique vendor account identifiers corresponding thereto, wherein the unique identifier is usable at vendor points of sale as a proxy for the individual unique vendor account identifiers for settlement of purchases by the user;

in response to a purchase request using the consolidated purchase card at a specific vendor's point of sale, determining whether the consolidated purchase card is cross-referenced to a vendor-issued account that is activated with the vendor;

in response to determining whether the consolidated purchase card is cross-referenced to a vendor-issued account that is activated with the vendor, initiating execution of the purchase using the consolidated purchase card;

thereafter, aggregating a plurality of such purchases using the consolidated purchase card into a consolidated billing statement comprising a plurality of individual billing statements, wherein each individual billing statement in said plurality of individual billing statements comprises at least one purchase transaction initiated using the unique identifier; and presenting said consolidated billing statement to said user for payment;

receiving payment instructions comprising a payment funds amount to be applied to each of said individual billing statements in said plurality of billing statements; and processing said payment instructions to initiate payment of said payment funds amount from an individual source account of said user to predetermined vendor accounts corresponding to individual vendors.

16. The non-transitory computer usable medium of claim 15, wherein said payment funds amount to be applied to each of said individual billing statements comprises at least one of:
a fixed payment funds amount due;
a minimum payment funds amount due;
a maximum payment funds amount due;
a variable payment funds amount; or
a calculated payment funds amount.

17. The non-transitory computer usable medium of claim 16, wherein said user selects a subset of said individual billing statements in said plurality of billing statements for said application of payment funds amount.

18. The non-transitory computer usable medium of claim 16, wherein said user selects all of said individual billing statements in said plurality of billing statements for said application of payment funds amount.

19. The non-transitory computer usable medium of claim 18, wherein the minimum payment funds amount due is applied to each of said individual billing statements in said plurality of billing statements.

20. The non-transitory computer usable medium of claim 18, wherein the maximum payment funds amount due is applied to each of said individual billing statements in said plurality of billing statements.

21. The non-transitory computer usable medium of claim 18, wherein at least one of said payment funds amounts is applied to each of said individual billing statements in said plurality of billing statements.

* * * * *

UNITED STATES PATENT AND TRADEMARK OFFICE
CERTIFICATE OF CORRECTION

PATENT NO.         : 8,117,100 B1                                                                Page 1 of 1
APPLICATION NO.    : 12/051149
DATED              : February 14, 2012
INVENTOR(S)        : John C. Hopkins It is certified that error appears in the above-identified patent and that said Letters Patent is hereby corrected as shown below:

Cover Page, (73), Assignee, delete "Unites" and insert --United--

Signed and Sealed this
Twenty-seventh Day of March, 2012

David J. Kappos
*Director of the United States Patent and Trademark Office*